United States Patent
Delaney et al.

(10) Patent No.: US 9,898,511 B2
(45) Date of Patent: Feb. 20, 2018

(54) METHOD OF MANIPULATING VOCABULARY DEPENDING ON THE AUDIENCE

(71) Applicant: International Business Machines Corporation, Armonk, NY (US)

(72) Inventors: John V. Delaney, Kildalkey (IE); Fabien Heinen, Dublin (IE); Brian Hussey, Drogheda (IE); Stanley K. Jerrard-Dunne, Dublin (IE); Gordon Keenan, Naas (IE)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 14/603,345

(22) Filed: Jan. 22, 2015

(65) Prior Publication Data

US 2016/0217137 A1    Jul. 28, 2016

(51) Int. Cl.
*G06F 17/30* (2006.01)
*H04L 29/08* (2006.01)
*G06F 17/27* (2006.01)

(52) U.S. Cl.
CPC .......... *G06F 17/3053* (2013.01); *G06F 17/27* (2013.01); *G06F 17/30684* (2013.01); *G06F 17/30699* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 6,571,234 B1 * | 5/2003 | Knight | G06Q 10/10 |
| 6,782,510 B1 | 8/2004 | Gross et al. | |
| 6,912,519 B2 | 6/2005 | Shouji | |
| 2003/0014407 A1 * | 1/2003 | Blatter | G06F 17/30017 |
| 2006/0190809 A1 * | 8/2006 | Hejna, Jr. | G10L 25/48 |
| | | | 715/203 |
| 2009/0006187 A1 * | 1/2009 | Marcuvitz | G06Q 30/02 |
| | | | 705/14.66 |
| 2009/0254817 A1 | 10/2009 | Dreyfus et al. | |
| 2010/0131842 A1 | 5/2010 | Roose | |
| 2011/0295392 A1 * | 12/2011 | Cunnington | G06Q 10/10 |
| | | | 700/90 |
| 2012/0323579 A1 * | 12/2012 | Gibbon | G10L 15/1822 |
| | | | 704/270 |

(Continued)

OTHER PUBLICATIONS

IBM, System for Automated Cross-culture and Cross-geography Correctness Verification in Communication Systems, http://ip.com/ IPCOM/000191548, Jan. 7, 2010, ip.com No. 000191548.

(Continued)

*Primary Examiner* — Hung Le
(74) *Attorney, Agent, or Firm* — North Shore Patents, P.C.; Michele Liu Baillie

(57) ABSTRACT

A system for recommending content based on the audience, implemented by a computing processor, detects content that is to be transmitted to an audience. The system receives a user profile associated with the audience, and scores the content against the user profile to produce a rating. The content is weighted based on at least one attribute associated with the user profile. The system invokes an action in response to the rating.

8 Claims, 4 Drawing Sheets

For Ruth, Jewish female from the USA

| | Female | Male | US National | Hispanic | English | Irish | Australian | India | Pakistani |
|---|---|---|---|---|---|---|---|---|---|
| User Profile | 100 | 0 | 100 | 0 | 100 | 0 | 0 | 0 | 0 |

| | Homosexual | Chinese | Japanese | Greek | Jewish | Black American | Artist | French | |
|---|---|---|---|---|---|---|---|---|---|
| User Profile | 0 | 0 | 0 | 0 | 100 | 0 | 50 | 0 | |

(56) References Cited

U.S. PATENT DOCUMENTS

| | | | | |
|---|---|---|---|---|
| 2013/0282812 | A1* | 10/2013 | Lessin | G06Q 50/01 709/204 |
| 2013/0282813 | A1* | 10/2013 | Lessin | G06Q 10/063 709/204 |
| 2014/0075018 | A1* | 3/2014 | Maycotte | H04L 67/22 709/224 |
| 2014/0223295 | A1 | 8/2014 | Fratti et al. | |
| 2014/0334644 | A1* | 11/2014 | Selig | H03G 5/165 381/108 |
| 2015/0317071 | A1* | 11/2015 | Moore | G06F 3/0482 715/732 |
| 2015/0324821 | A1* | 11/2015 | Rincon | G06Q 30/0204 705/7.33 |
| 2016/0080485 | A1* | 3/2016 | Hamedi | H04L 67/02 709/204 |
| 2016/0266864 | A1* | 9/2016 | Rajendran | G09B 5/08 |

OTHER PUBLICATIONS

IBM, System and Method of Providing Audience based Grammar and Spell Checking, http://ip.com/IPCOM/000188453, Oct. 8, 2009, ip.com No. 000188453.

IBM, System and Method for Electronic Word Quality Checker, http://ip.com/IPCOM/000180494, Mar. 10, 2009, ip.com No. 000180494.

Soyer, Apple's Politically Correct Spell-Checker, http://www.alphecca.com/?p=1185, Mar. 12, 2012.

Rieber, Political Correctness, http://www.bible.ca/ef/topical-political-correctness.htm, Jul. 1996, Expository Files 3.7.

Anonymous, The Costs of Poor Communication, https://sites.google.com/site/linchpinlearning/value/the-costs-of-poor-communication.

List of IBM Patents or Patent Applications Treated as Related.

* cited by examiner

For Ruth, Jewish female from the USA

| | Female | Male | US National | Hispanic | English | Irish | Australian | India | Pakistani |
|---|---|---|---|---|---|---|---|---|---|
| User Profile | 100 | 0 | 100 | 0 | 100 | 0 | 0 | 0 | 0 |
| | Homosexual | Chinese | Japanese | Greek | Jewish | Black American | Artist | French | |
| User Profile | 0 | 0 | 0 | 0 | 100 | 0 | 50 | 0 | |

FIG. 2A

User Profile Linda@us.ibm.com

| | Female | Male | US National | Hispanic | English | Irish | Australian | India | Pakistani |
|---|---|---|---|---|---|---|---|---|---|
| User Profile | 100 | 0 | 100 | U | U | U | U | U | U |
| | Homosexual | Chinese | Japanese | Greek | Jewish | Black American | Artist | French | |
| User Profile | U | U | U | U | U | U | U | U | |

FIG. 2B

| | Thesaurus / Dictionary | | | | | | | | | |
|---|---|---|---|---|---|---|---|---|---|---|
| | Black | Negro | Paki | Bust | Unionist | Socialist | Hitler | Cyprus | Laicity | Clergyman |
| Definition | | | | | | | | | | |
| Synonym | | | | | | | | | | |
| Female | 80 | 80 | 100 | 100 | 80 | 50 | 80 | | | 100 |
| Male | 50 | 80 | 100 | 80 | 80 | 50 | 80 | | | 50 |
| US national | 50 | 100 | 100 | 80 | 80 | 100 | 80 | | 20 | |
| Hispanophone | 50 | 30 | 100 | 80 | 80 | 50 | 80 | | | |
| English | 50 | 80 | 100 | 80 | 80 | 50 | 80 | | | |
| Irish | 50 | 80 | 100 | 80 | 100 | 50 | 80 | | 50 | |
| Australian | 50 | 80 | 100 | 80 | 80 | 50 | 80 | | | |
| India | 50 | 80 | 100 | 80 | 80 | 50 | 80 | | | |
| Pakistani | 50 | 80 | 100 | 80 | 80 | 50 | 80 | | 100 | |
| Homosexual | 50 | 80 | 100 | 80 | 80 | 50 | 80 | | | |
| Chinese | 50 | 80 | 100 | 80 | 80 | 50 | 80 | | 0 | |
| Japanese | 50 | 80 | 100 | 80 | 80 | 50 | 80 | | | |
| Greek | 50 | 80 | 100 | 80 | 80 | 50 | 80 | 0 | | |
| Jewish | 50 | 80 | 100 | 80 | 80 | 50 | 100 | | | |
| Black American | 80 | 100 | 100 | 80 | 80 | 100 | 80 | | | |
| Artist | 50 | 80 | 100 | 30 | 80 | 50 | 80 | | | |
| French | 50 | 80 | 100 | 80 | 80 | 30 | 80 | | 0 | |
| German | 50 | 80 | 100 | 80 | 80 | 30 | 100 | | | |
| Turkish | | | | | | | | 100 | 50 | |

FIG. 3

METHOD OF MANIPULATING VOCABULARY DEPENDING ON THE AUDIENCE

BACKGROUND

Communicating effectively to an audience is very important. Different people have different sensitivities to particular words, and words may have different meanings for people of different ages, different regions, etc. Even with the best of intentions, an author may not be aware of better word choices that can foster more effective communication with an audience. The author may not be aware of word choices that may be offensive to an audience. The author might not know the audience very well, as in the case of authoring an email to a group of recipients. The author might not know the audience at all, as in the, case of authoring a blog post. Therefore, it would be beneficial to have a way to communicate more effectively with an audience, based on the words authored in the communication and the traits/sensitivities associated with the audience with regard to those words. Simply put, there are often better word choices to communicate effectively with a particular audience, and to reduce the chance of offending that audience.

SUMMARY

According to an embodiment disclosed herein, in a method for recommending content based on the audience, implemented by a computing processor, the processor detects content that is to be transmitted to an audience. The processor receives a user profile associated with the audience, and scores the content against the user profile to produce a rating. The content is weighted based on at least one trait associated with the user profile. The processor invokes an action in response to the rating.

In one aspect of embodiments disclosed herein, when the method receives the user profile associated with the audience, the method associates at least one trait with the audience, and weights the trait based on an importance of the trait to the audience.

In one aspect of embodiments disclosed herein, when the method associates at least one trait with the audience, the method determines the audience is comprised of a plurality of users. The method identifies at least one user trait associated with each of the plurality of users. Then, for each of the user traits, the method creates a composite trait, and associates the composite trait with the audience.

In one aspect of embodiments disclosed herein, when the method creates the composite trait, the method identifies an outlier trait, and incorporates the outlier trait into the composite trait by weighting the outlier trait more than a non-outlier trait.

In one aspect of embodiments disclosed herein, when the method incorporates the outlier trait into the composite trait by weighting the outlier trait more than a non-outlier trait, the method creates the composite trait from the outlier trait.

In one aspect of embodiments disclosed herein, when the method weights at least one trait based on the importance of the trait to the audience, the method weights the trait to determine if the content effectively communicates with the audience.

In one aspect of embodiments disclosed herein, when the method weights at least one trait to effectively communicate with the audience, the method weights the trait to reduce a risk of offending the audience.

In one aspect of embodiments disclosed herein, when the method scores the content against the user profile to produce the rating, where the content is weighted based on at least one trait associated with the user profile, the method ranks at least one vocabulary word associated with the content according to an effective communication rating for the audience. The method compares the ranking of the vocabulary word to at least one trait associated with the user profile, and produces a score of how effective the vocabulary word is in communicating to the audience associated with the user profile.

In one aspect of embodiments disclosed herein, when the method invokes the action in response to the rating, the method identifies ineffectively communicated content. The method then performs at least one of suggesting at least one substitution for the ineffectively communicated content, and/or automatically modifying the ineffectively communicated content.

In one aspect of embodiments disclosed herein, when the method invokes the action in response to the rating, the method automatically censors at least one of offensive content, misleading content, and ineffectively communicated content.

In one aspect of embodiments disclosed herein, when the method invokes the action in response to the rating, the method automatically modifies at least one of offensive content, misleading content, and ineffectively communicated content.

In one aspect of embodiments disclosed herein, when the method invokes the action in response to the rating, the method determines the audience is comprised of at least two users and replicates the content. The method then modifies each of the replicated content according to the respective user profile associated with each of the users. The modifying may be performed by at least one of automatically modifying the content, and allowing a user to modify the content.

System and computer program products corresponding to the above-summarized methods are also described and claimed herein.

BRIEF DESCRIPTION OF THE SEVERAL VIEWS OF THE DRAWINGS

FIG. 2A and FIG. 2B illustrate example embodiments of user profiles with weightings for each trait in the user profile.

FIG. 3 illustrates an example embodiment of a listing of vocabulary words, traits associated with each word, and a weighting associated with each trait as it applies to each vocabulary word.

DETAILED DESCRIPTION

Figure 1:
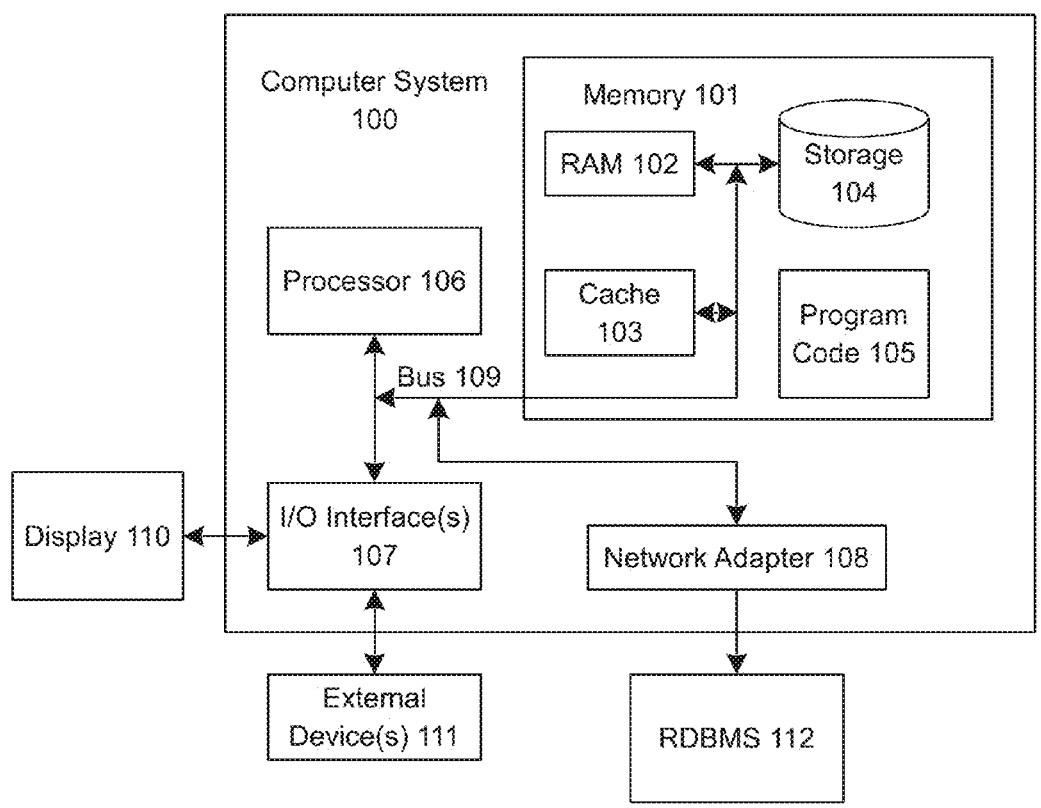
FIG. 1 illustrates an embodiment of a system for recommending content based on the audience, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for recommending content based on the audience according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

FIG. 2A illustrates an example embodiment of a user profile with weightings for each trait in the user profile. In this example, there is a weighting for each trait, where a weighting of "100" indicates a high affinity for the trait, a weighting of "0" indicates no affinity for the trait, and a weighting of "U" indicates the affinity for the trait is unknown. In FIG. 2A, the "Female" trait is weighted "100" indicating a high affinity, whereas the "Male" trait is weighted "0" indicating no affinity. From these two traits, the user most likely identifies as female. In an example embodiment, an affinity may indicate the extent to which the trait is important to the user, and the extent to which communication (to that user) may be modified to be effective, or more effective when communicating with that user. In another example embodiment, an affinity may indicate the extent to which the trait is an important component in the user's profile. An affinity may indicate whether the user would be offended by words that also have been ranked with a high affinity (for that trait).

FIG. 2B illustrates another example embodiment of a user profile with weightings for each trait in the user profile. In this example embodiment, the user profile indicates a high affinity for the traits "Female", and "US National". The other traits are weighted as "U" (Unknown). A user profile, as illustrated in FIG. 2B may be generated from, for example, a user's email address, an IP address obtained from a user's computer, GPS coordinates (for example, from a mobile device), etc.

FIG. 3 illustrates an example embodiment of a listing of vocabulary words, a listing of traits, and a weighting associated with each trait as it applies to each respective vocabulary word and a particular audience's affinity with regard to that word. In an example embodiment, a Thesaurus, or dictionary is maintained with personality traits. Personality traits might include nationalities, race, religion, gender, generation/age, sexual orientation, location, political affiliation, etc. Each trait is weighted based on a risk of how ineffective that word might be when used to communicate with a particular audience (based on the personality traits of that audience). For example, a particular trait might have a weight anywhere from "0" (no risk) to "100" (high risk). In an example embodiment, the word "Hitler" would be very sensitive for a German or Jewish person, and is weighted "100". The word "Socialist" might be pejorative in the USA, and is equivalent to "Communist", and therefore, is weighted "100" for an audience that has a high affinity for the "US National" trait. The word "Socialist", however, is used to describe a mainstream moderate party in France or Germany, and is not sensitive to an audience that has a high French or German trait affinity. Therefore, the word "Socialist" is weighted "30" for audiences that have a high French or German trait affinity.

Figure 4:
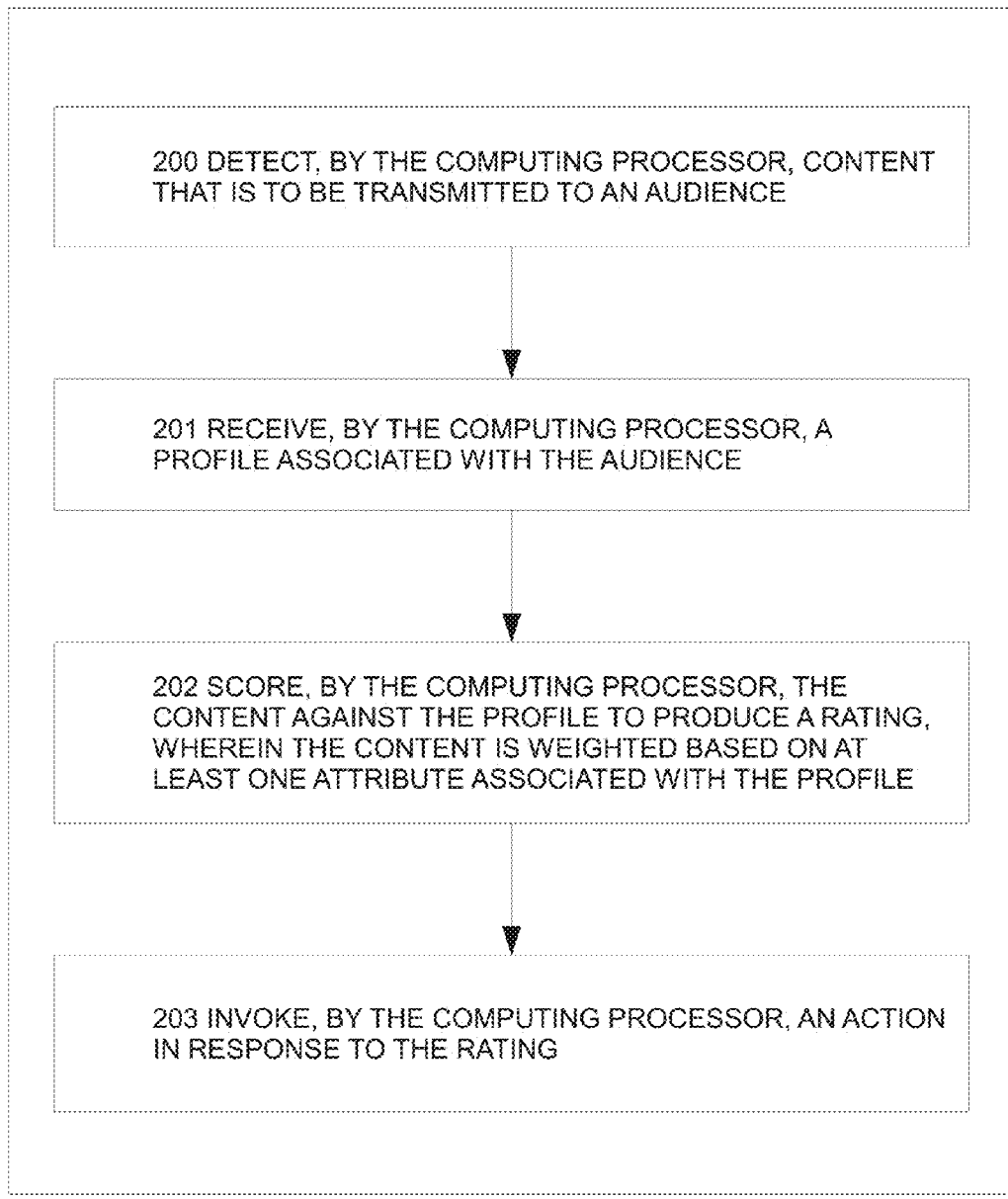
FIG. 4 is a flowchart illustrating an embodiment of a method for recommending content based on the audience, according to embodiments disclosed herein.

FIG. 4 illustrates an embodiment of a method for recommending content based on the audience. At 200, the method, via the computing processor 106, detects content that is to be transmitted to an audience. For example, content may be an email that is to be sent, and the audience may be one or more recipients who receive the email. The content may be a blog or social media posting, and the audience may be anyone who has access to the blog. The content may also be an interactive chat session, and the audience may be the individuals participating in the chat session.

At 201, the method, via the computing processor 106, receives a user profile associated with the audience. Example user profiles are illustrated in FIG. 2A and FIG. 2B. Each user profile has at least one trait, and an affinity associated with that trait. In an example embodiment, an author of content may not know all the recipients of the content. For example, an author who posts a blog posting might not know the users who access the blog. An author of email may not know all the recipients on the email list, and/or may not know if any of those recipients will forward the email to additional recipients (additional recipients who the author of the email may also not know). A user profile associated with each recipient (as in the case of an email recipient), or an analytically generated user profile (as in the case of those who access blogs and/or access social media) may be provided by the method or by another source. For example, a website hosting a blog might provide analytics that identify certain demographics of viewers of the blog. Some blogs require viewers to log in with an email address prior to posting a comment to the blog. Email addresses may provide data as to the location of the viewer or other details, such as organizations the viewer belongs to, or even places of employment.

At 202, the method, via the computing processor 106, scores the content against the user profile to produce a rating, where the content is weighted based on at least one trait associated with the user profile. In an example embodiment, an author generates an email (i.e., content), and selects recipients (i.e., the audience) to receive that email. The method scores the content of the email against the user profiles associated with the recipients to produce a rating of the content. The rating assesses how effectively that content will communicate with the recipients, based on the weighting of the traits within the user profiles.

At 202, the method, via the computing processor, invokes an action in response to the rating. In an example embodiment, based on the rating associated with the content, the method invokes an action, such as suggesting different words, censoring words, automatically modifying the content, etc.

In an example embodiment, when the method receives the user profile associated with the audience, the method associates at least one trait with the audience. The method then weights the trait based on an importance of the trait to the audience. For example, the audience may be one recipient or multiple recipients. The recipient(s) may each have only one or multiple traits that are known (i.e., not having a rating of "Unknown" as illustrated in FIG. 2B). The method may associate one or more traits with the audience, and then weight each of the traits based on an affinity or importance of that trait to the audience. The method assesses effective communication of the content based on the weighting of the traits of the audience that is to receive the content.

In an example embodiment, when the method associates at least one trait with the audience, the method may determine that the audience is comprised of a plurality of users. The method then identifies at least one user trait associated with each of the plurality of users. The traits are identified from the user profiles (for example, as illustrated in FIG. 2A and FIG. 2B) associated with each of the users. For each of the user traits, the method creates a composite trait, and associates the composite trait with the audience. In other words, the method may determine that the audience is comprised of multiple users, and may create a composite user profile that represents the audience (i.e., the multiple users). The composite user profile may be comprised of composite traits for the each of the traits associated with the multiple users. The method would then score the content against this composite user profile (comprised of composite traits) to assess the effectiveness of the content for that composite audience.

In an example embodiment, when the method creates the composite trait, the method identifies an outlier trait, and incorporates the outlier trait into the composite trait by weighting the outlier trait more than a non-outlier trait. For example, the method may assess effective communication by reducing the risk of offending the audience. When the method creates a composite trait from an audience comprised of multiple users, the method may identify one or more users that would be highly offended by the content. The method weights the traits of these potentially highly offended users more than other users when creating the composite traits, and then when creating the composite audience to insure that the audience, as a whole, is not offended.

In an example embodiment, when the method incorporates the outlier trait into the composite trait by weighting the outlier trait more than a non-outlier trait, the method creates the composite trait from the outlier trait. For example, when the method creates a composite trait from an audience comprised of multiple users, the method may identify one or more users that would be highly offended by the content. To err on the side of caution, the method may create the composite trait (and then create the composite audience) from the traits of the potentially highly offended user(s) so as to reduce the risk of offending the audience.

In an example embodiment, when the method weights at least one trait based on the importance of at least one trait to the audience, the method weights the trait to communicate effectively with the audience. The method selects a preferred vocabulary for the audience, customizing the wording for the recipients in the audience (and possibly for each recipient in the audience) based on the user profiles of the recipients within the audience.

In an example embodiment, when the method weights at least one trait to communicate effectively with the audience, the method weights the trait to reduce a risk of offending the audience. The method reduces the risk of offending the audience by weighting potentially offensive words as those words pertain to the audience.

In an example embodiment, when the method scores the content against the user profile to produce the rating, where the content is weighted based on at least one trait associated with the user profile, the method ranks at least one vocabulary word associated with the content according to an effective communication rating for the audience. FIG. 3 illustrates the ranking of the vocabulary word against the traits that are in the user profiles. The method compares the ranking of the vocabulary word to at least one trait associated with the user profile, and produces a score of how effective the vocabulary word is in communicating to the audience associated with the user profile. For example, FIG. 3 illustrates that the word "Unionist" is ranked as having a high affinity for users who have a high affinity for the "Irish" trait. In other words, "Unionist" would not be a good word choice to communicate effectively with a user being weighted with a high affinity for the "Irish" trait (i.e., someone who is Irish or identifies with Irish people), and might, in fact, offend that user.

In an example embodiment, when the method invokes the action in response to the rating, the method identifies ineffectively communicated content, and performs at least one of suggesting at least one substitution for the ineffectively communicated content, and automatically changing the ineffectively communicated content. For example, an author creates an email addressed to a recipient. When the method identifies ineffectively communicated content (perhaps even offensive content), the method identifies that content and may suggest substituted content to increase the effectiveness of the communication (or reduce the offensiveness of the communication) based on user profiles associated with the recipient or recipients. The method may also automatically modify the content to increase the effectiveness of the communication (or reduce the offensiveness of the communication) based on user profiles associated with the recipient or recipients. The method may also provide a warning to the author that content is ineffectively communicated. The method may provide a warning to the author, such as highlighting one or more of the recipients so that the author has a choice to remove those recipient(s) from the email list. The author may have the option to heed, or ignore the warning. In another example embodiment, the method may highlight the words within the content to notify the author that the highlighted words may need to be modified or eliminated.

In an example embodiment, when the method invokes the action in response to the rating, the method may automatically censor offensive content, misleading content, and/or ineffectively communicated content. For example, the method may determine the content would offend the audience, and removes that content from, for example, the email, or the social media posting.

In an example embodiment, when the method invokes the action in response to the rating, the method automatically modifies offensive content, misleading content, and/or ineffectively communicated content. For example, the method may automatically modify an email when the method determines that the content may be offensive, misleading or ineffectively communicated, based on the audience for who the email is intended, and the user profile(s) associated with that audience.

In an example embodiment, when the method invokes the action in response to the rating, the method determines that the audience is comprised of at least two users. The method replicates the content, and modifies each of the replicated content according to the respective user profile associated with each of the at least two users. The method may automatically modify the content, or allow the author to modify the content. For example, the method determines the audience is comprised of more than one user. The method creates multiple copies of the content, and modifies each copy (or allows the author to modify each copy) so that each of the recipients receives content that is customized according to the respective user profile associated with each of the recipients.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for recommending content based on the audience, the computer program product comprising:
  a non-transitory computer readable storage medium having computer readable program code embodied therewith, the program code executable by a computing processor to:
  detect, by the computing processor, content that is to be transmitted to an audience, from an author;

receive, by the computing processor, a user profile associated with the audience, wherein the user profile is a previously compiled repository comprising at least one trait, and at least one weighting for each trait;

score, by the computing processor, the content against the user profile to produce a rating, wherein the content is weighted based on at least one attribute associated with the user profile; and invoke, by the computing processor, an action in response to the rating, wherein the action comprises generating a recommendation for the author, wherein an objective of the recommendation is to advise the author to improve an effectiveness associated with communicating the content to the audience by advising the author to alter the content based on the user profile, based on the user profile and the content, and wherein the author has the option to incorporate the recommendation into the content prior to the author transmitting the content to the audience.

2. The computer program product of claim 1 wherein the computer readable program code configured to receive the user profile associated with the audience is further configured to:

associate the at least one attribute with the audience; and weight the at least one attribute based on an importance of the at least one attribute to the audience.

3. The computer program product of claim 1 wherein the computer readable program code configured to score the content against the user profile to produce the rating, wherein the content is weighted based on the at least one attribute associated with the user profile is further configured to:

rank at least one vocabulary word associated with the content according to an effective communication rating for the audience;

compare the ranking of the at least one vocabulary word to the at least one attribute associated with the user profile; and produce a score of how effective the at least one vocabulary word is in communicating to the audience associated with the user profile.

4. The computer program product of claim 1 wherein the computer readable program code configured to invoke the action in response to the rating is further configured to:

identify ineffectively communicated content; and perform at least one of:

i) suggesting at least one substitution for the ineffectively communicated content; and ii) automatically modifying the ineffectively communicated content.

5. A system comprising:

a computing processor; and a computer readable storage medium operationally coupled to the processor, the computer readable storage medium having computer readable program code embodied therewith to be executed by the computing processor, the computer readable program code configured to:

detect, by the computing processor, content that is to be transmitted to an audience, from an author;

receive, by the computing processor, a user profile associated with the audience, wherein the user profile is a previously compiled repository comprising at least one trait, and at least one weighting for each trait;

score, by the computing processor, the content against the user profile to produce a rating, wherein the content is weighted based on at least one attribute associated with the user profile; and invoke, by the computing processor, an action in response to the rating, wherein the action comprises generating a recommendation for the author, wherein an objective of the recommendation is to advise the author to improve an effectiveness associated with communicating the content to the audience by advising the author to alter the content based on the user profile, based on the user profile and the content, and wherein the author has the option to incorporate the recommendation into the content prior to the author transmitting the content to the audience.

6. The system of claim 5 wherein the computer readable program code configured to receive the user profile associated with the audience is further configured to:

associate the at least one attribute with the audience; and weight the at least one attribute based on an importance of the at least one attribute to the audience.

7. The system of claim 5 wherein the computer readable program code configured to score the content against the user profile to produce the rating, wherein the content is weighted based on the at least one attribute associated with the user profile is further configured to:

rank at least one vocabulary word associated with the content according to an effective communication rating for the audience;

compare the ranking of the at least one vocabulary word to the at least one attribute associated with the user profile; and produce a score of how effective the at least one vocabulary word is in communicating to the audience associated with the user profile.

8. The system of claim 5 wherein the computer readable program code configured to invoke the action in response to the rating is further configured to:

identify ineffectively communicated content; and perform at least one of:

i) suggesting at least one substitution for the ineffectively communicated content; and ii) automatically modifying the ineffectively communicated content.

* * * * *